(12) United States Patent
Lee et al.

(10) Patent No.: US 11,667,108 B2
(45) Date of Patent: Jun. 6, 2023

(54) LAMINATED STEEL PLATE, MANUFACTURING METHOD THEREFOR, AND SHEET TO BE USED THEREFOR

(71) Applicant: SKC ECO-SOLUTIONS CO., LTD., Chungcheongbuk-do (KR)

(72) Inventors: Seokin Lee, Seoul (KR); Kweon Hyung Han, Gyeonggi-do (KR); Kwangho Jang, Seoul (KR)

(73) Assignee: SKC ECO-SOLUTIONS CO., LTD., Chungcheongbuk-do (KR)

( * ) Notice: Subject to any disclaimer, the term of this patent is extended or adjusted under 35 U.S.C. 154(b) by 11 days.

(21) Appl. No.: 17/251,901

(22) PCT Filed: May 30, 2019

(86) PCT No.: PCT/KR2019/006481
§ 371 (c)(1),
(2) Date: Dec. 14, 2020

(87) PCT Pub. No.: WO2019/245184
PCT Pub. Date: Dec. 26, 2019

(65) Prior Publication Data
US 2021/0122141 A1 Apr. 29, 2021

(30) Foreign Application Priority Data

Jun. 20, 2018 (KR) .................. 10-2018-0070767
May 29, 2019 (KR) .................. 10-2019-0063082

(51) Int. Cl.
*B32B 15/09* (2006.01)
*B32B 15/01* (2006.01)
(Continued)

(52) U.S. Cl.
CPC ............ *B32B 15/09* (2013.01); *B32B 15/012* (2013.01); *B32B 15/082* (2013.01);
(Continued)

(58) Field of Classification Search
None
See application file for complete search history.

(56) References Cited

U.S. PATENT DOCUMENTS

2009/0275251 A1* 11/2009 Bonnet .................. C08L 33/12
428/421
2015/0055033 A1* 2/2015 Imamura ................. G02B 1/14
359/884
2017/0297307 A1* 10/2017 Shinmyo .................. B32B 3/30

FOREIGN PATENT DOCUMENTS

JP 05-261853 A 10/1993
JP H05/261853 A * 10/1993 ............. B32B 15/08
(Continued)

OTHER PUBLICATIONS

Sasaki—JP H05-261853 A—ISR D2—MT—fluoresin+other layers on steel sheet—1993 (Year: 1993).*
(Continued)

*Primary Examiner* — John Vincent Lawler
(74) *Attorney, Agent, or Firm* — IP & T Group LLP (57) ABSTRACT

An embodiment relates to a sheet comprising an acrylic resin layer and a fluorinated polymer resin layer directly formed on one surface of the acrylic resin layer; a laminated steel plate comprising the sheet; and a manufacturing method therefor.

9 Claims, 2 Drawing Sheets

(51) Int. Cl.
    *B32B 15/082* (2006.01)
    *B32B 15/085* (2006.01)
    *B32B 27/08* (2006.01)
    *B32B 27/30* (2006.01)
    *B32B 33/00* (2006.01)
    *B32B 37/12* (2006.01)
    *B32B 37/15* (2006.01)

(52) U.S. Cl.
    CPC ............ *B32B 15/085* (2013.01); *B32B 27/08* (2013.01); *B32B 27/304* (2013.01); *B32B 27/308* (2013.01); *B32B 33/00* (2013.01); *B32B 37/12* (2013.01); *B32B 37/15* (2013.01); B32B 2250/03 (2013.01); B32B 2250/04 (2013.01); B32B 2250/05 (2013.01); B32B 2255/06 (2013.01); B32B 2255/26 (2013.01); B32B 2255/28 (2013.01); B32B 2307/538 (2013.01); B32B 2307/712 (2013.01); B32B 2307/714 (2013.01); B32B 2307/732 (2013.01); B32B 2311/24 (2013.01); B32B 2311/30 (2013.01); B32B 2323/00 (2013.01); B32B 2327/06 (2013.01); B32B 2327/12 (2013.01); B32B 2333/08 (2013.01); B32B 2367/00 (2013.01)

(56) References Cited

FOREIGN PATENT DOCUMENTS

| | | | | |
|---|---|---|---|---|
| JP | H7-024970 A | | 1/1995 | |
| JP | H11/48401 A | * | 2/1999 | ............ B32B 15/08 |
| JP | 2004-066456 A | | 3/2004 | |
| JP | 2017/170732 A | * | 9/2017 | ........... B32B 15/082 |
| JP | 2017-170732 A | | 9/2017 | |
| KR | 10-2012-0090252 A | | 8/2012 | |
| KR | 10-2016-0053417 A | | 5/2016 | |
| KR | 10-2017-0107968 A | | 9/2017 | |

OTHER PUBLICATIONS

Kato—JP H11-48401—MT—fluororesin coated steel sheet—1999 (Year: 1999).*
Ochiai—acrylic film technolloy—acrylic PMMA film roughness—2006 (Year: 2006).*
Nambu—JP 2017-170732 A—ISR D3—MT—w-acrylic, print, fluoresin, PVC layers—2017 (Year: 2017).*
Office Action for Chinese Patent Application No. 201910532629.3 issued by the Chinese Patent Office dated Aug. 8, 2022.

* cited by examiner

LAMINATED STEEL PLATE, MANUFACTURING METHOD THEREFOR, AND SHEET TO BE USED THEREFOR

This application is a national stage application of PCT/KR2019/006481 filed on May 30, 2019, which claims priorities of Korean patent application number 102018-0070767 filed on Jun. 20, 2018 and 10-2019-0063082 filed on May 29, 2019. The disclosure of each of the foregoing applications is incorporated herein by reference in its entirety.

TECHNICAL FIELD

Embodiments relate to a laminated steel sheet, a process for preparing the same, and a sheet to be used therefor. More specifically, the embodiments relate to a laminated steel sheet, which is capable of withstanding a high-temperature lamination step while it has weatherability, chemical resistance, and contamination resistance, a process for preparing the same, and a sheet to be used therefor.

BACKGROUND ART

Laminated steel sheets refer to a product in which various functional film layers are formed on the surface of a steel sheet made of an electro-galvanized steel sheet, a hot-dip galvanized steel sheet, a cold-rolled steel sheet, a stainless steel sheet, a galvalume steel sheet, or an aluminum coil.

Such a laminated steel sheet is mainly applied to the exterior cases of home appliances such as refrigerators, washing machines, air conditioners, and the like. It has an advantage of excellent appearance characteristics and excellent processability as compared with the conventional coated steel sheets.

In addition, laminated steel sheets are applied to interior/exterior construction materials. In such a case, once a steel sheet has been manufactured, it is subjected to separate processing steps and a film is bonded thereto, it must satisfy the conditions such as excellent processability, adhesion, weatherability, and corrosion resistance.

In general, a polyethylene terephthalate (PET) film, a polyvinyl chloride (PVC) film, and the like are used as a protective film on a laminated steel sheet. However, PET films are somewhat poor in UV resistance, processability, and crack resistance, and PVC films are not good in weatherability, chemical resistance, and contamination resistance. Thus, such laminated steel sheets are somewhat inappropriate to be used as interior/exterior construction materials.

In order to improve this, it has been recently attempted to apply a fluorinated polymer resin layer having excellent weatherability as a protective film. In general, however, fluorinated polymer resin layers are by nature poor in adhesion to other functional films. If a laminated film is formed by coating a raw material resin to solve this problem, the applicability to a product is not desirable.

In addition, when a functional film such as a protective film is laminated on a steel sheet, high-temperature conditions are required to secure the bonding strength with the steel sheet. In general, however, fluorinated polymer resin layers are not good in thermal resistance. Thus, there is a problem that the film is deformed, failing to withstand the high-temperature conditions.

DETAILED DESCRIPTION OF THE INVENTION

Technical Problem

Accordingly, the embodiments aim to provide a laminated steel sheet, which is capable of withstanding a high-temperature lamination step while it has weatherability, chemical resistance, and contamination resistance, a process for preparing the same, and a sheet to be used therefor.

Solution to the Problem

The laminated steel sheet according to an embodiment comprises a steel sheet; and a first sheet disposed on the steel sheet, wherein the first sheet comprises an acrylic resin layer and a fluorinated polymer resin layer formed directly on one side of the acrylic resin layer.

The process for preparing a laminated steel sheet according to another embodiment comprises coextruding an acrylic resin and a fluorinated polymer resin to prepare a first sheet; laminating the first sheet with a second sheet comprising a substrate layer selected from the group consisting of a polyester resin layer, a polyolefin resin layer, a poly vinyl chloride resin layer, an aluminum foil layer, and a combination thereof to prepare a composite sheet; and laminating the composite sheet with a steel sheet.

The sheet according to still another embodiment comprises an acrylic resin layer and a fluorinated polymer resin layer formed by coextruding an acrylic resin and a fluorinated polymer resin.

Advantageous Effects of the Invention

The laminated steel sheet according to the embodiment, which comprises a fluorinated polymer resin layer at the outmost, is excellent in weatherability (in particular, UV resistance), chemical resistance, and contamination resistance. In addition, since an acrylic resin layer is formed on one side of the fluorinated polymer resin layer, it is possible to compensate for the low adhesion of the fluorinated polymer resin layer.

According to a preferable embodiment, since a substrate layer having excellent thermal resistance is interposed between the fluorinated polymer resin layer and the steel sheet, it is possible to prevent the fluorinated polymer resin layer having insufficient thermal resistance from being deformed in a high-temperature lamination process.

In addition, according to a preferable embodiment, since the acrylic resin layer and the fluorinated polymer resin layer are laminated by coextrusion, no separate adhesive is required between them. Since the coextruded film has almost no difference in the surface roughness, it is possible to securely suppress the deformation in the lamination process at high temperatures.

EXPLANATION OF REFERENCE NUMERALS

10: laminated steel sheet
11: composite sheet
20: extruder
100: first sheet
110: fluorinated polymer resin layer 120: acrylic resin layer
200: second sheet
210: adhesive layer
220: functional layer
230: substrate layer
310: adhesive layer
320: undercoat layer
330: pretreatment layer
340: steel sheet

BEST MODE FOR CARRYING OUT THE INVENTION

Throughout the description of the embodiments, in the case where each layer, hole, window, or region is mentioned to be formed "on" or "under" another layer, hole, window, or region, it means not only that one element is directly formed on or under another element, but also that one element is formed on or under another element with other element(s) interposed between them.

Also, the term "on" or "under" with respect to each element may be referenced to the drawings. For the sake of description, the sizes of individual elements in the appended drawings may be exaggeratedly depicted and do not indicate the actual sizes.

In addition, all numbers expressing the physical properties, dimensions, and the like of components used herein are to be understood as being modified by the term "about" unless otherwise indicated.

The laminated steel sheet according to an embodiment comprises a steel sheet; and a first sheet disposed on the steel sheet, wherein the first sheet comprises an acrylic resin layer and a fluorinated polymer resin layer formed directly on one side of the acrylic resin layer.

Laminated Steel Sheet

Figure 1:
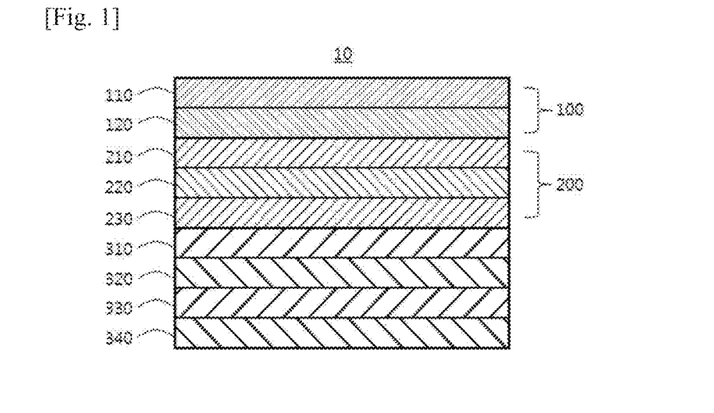
FIG. 1 shows the layer configuration of a laminated steel sheet according to an embodiment.

FIG. 1 shows the layer configuration of a laminated steel sheet according to an embodiment.

Referring to FIG. 1, the laminated steel sheet (10) according to an embodiment comprises a steel sheet (340); and a first sheet (100) disposed on the steel sheet (340), wherein the first sheet (100) comprises an acrylic resin layer (120); and a fluorinated polymer resin layer (110) formed directly on one side of the acrylic resin layer (129).

According to an embodiment, the laminate steel sheet (10) may further comprise a second sheet (200) between the steel sheet (340) and the first sheet (100), wherein the second sheet (200) comprises a substrate layer (230) selected from the group consisting of a polyester resin layer, a polyolefin resin layer, a polyvinyl chloride resin layer, an aluminum foil layer, and a combination thereof.

First Sheet

The first sheet (100) comprises an acrylic resin layer (120); and a fluorinated polymer resin layer (110) formed directly on one side of the acrylic resin layer (120).

Since an acrylic resin layer is formed on one side of the fluorinated polymer resin layer as described above, it is possible to compensate for the low adhesion of the fluorinated polymer resin layer.

According to an embodiment, the first sheet may be prepared by coextrusion.

Specifically, the first sheet (100) is prepared by coextrusion. That is, the first sheet (100) comprises an acrylic resin layer and a fluorinated polymer resin layer formed by coextruding an acrylic resin and a fluorinated polymer resin.

Thus, an adhesive may not be present between the acrylic resin layer and the fluorinated polymer resin layer, so that it is possible to prevent a deterioration of the properties due to an adhesive. In addition, the acrylic resin layer and the fluorinated polymer resin layer may have excellent adhesion between them even without an adhesive.

Fluorinated Polymer Resin Layer

The fluorinated polymer resin layer (110) comprises a fluorinated polymer resin in an amount of 50% by weight or more, 70% by weight or more, or 90% by weight or more.

The fluorinated polymer resin may be, for example, a polyvinylidene fluoride (PVdF) resin, Hence, the fluorinated polymer resin layer may be a PVdF resin layer, that is, a PVdF film.

The PVdF resin may be a homopolymer or a copolymer of vinylidene fluoride (VF2). In such event, the copolymer may comprise at least 50% by weight of VF2 and the balanced content of other monomers copolymerizable with VF2.

A fluorinated monomer is preferable as the comonomer copolymerizable with the VF2. Specifically, examples thereof include vinyl fluoride; trifluoroethylene (VF3); chlorotrifluoroethylene (CTFE); 1,2-difluoroethylene; tetrafluoroethylene (TFE); hexafluoropropylene (HFP); perfluoro (alkyl vinyl) ethers such as perfluoro(methyl vinyl) ether (PMVE), perfluoro(ethyl vinyl) ether (PEVE), and perfluoro (propyl vinyl) ether (PPVE); perfluoro(1,3-dioxol); perfluoro(2,2-dimethyl-1,3-dioxole) (PDD); and mixtures thereof. Preferably, the comonomer may be chlorotrifluoroethylene (CTFE), hexafluoropropylene (HFP), trifluoroethylene (VF3), or tetrafluoroethylene (TFE).

The PVdF resin may preferably have a viscosity in the range of 4,000 poise to 12,000 poise when measured at 230° C. at a shear rate of $100\ s^{-1}$ using a rheometer. A PVdF resin having a viscosity in the above range may be more suitable for extrusion and injection molding According to an embodiment, the fluorinated polymer resin layer may be disposed as the outermost layer of the laminated steel sheet. Thus, the laminated steel sheet may be very excellent in weatherability (in particular, UV resistance), chemical resistance, and contamination resistance.

Acrylic Resin Layer

The acrylic resin layer (120) comprises an acrylic resin in an amount of 50% by weight or more, 70% by weight or more, or 90% by weight or more.

The acrylic resin may be, for example, a poly(methyl methacrylate) (PMMA) resin. Hence, the acrylic resin layer may be a PMMA resin layer, that is, a PMMA film.

The PMMA resin may be a homopolymer of a methyl methacrylate (MMA) monomer or a copolymer thereof with other comonomers. When the PMMA resin is a copolymer, it is preferably a polymer in which MMA and a comonomer are copolymerized at a weight ratio of 50:50 to 99:1.

Examples of the comonomer that can be copolymerized with MMA include alkyl (meth)acrylate, acrylonitrile, butadiene, styrene, isoprene, and mixtures thereof. Preferred copolymers include those in which at least one of methyl acrylate and ethyl acrylate as a comonomer is copolymerized in a content of 1% by weight to 20% by weight.

The PMMA resin may be functionalized. For example, it may contain an acid, acid chloride, alcohol, or anhydride functional group, and this functional group may be introduced by grafting or copolymerizing a compound having a functional group. Preferred among the above is an acid functional group provided by an acrylic acid copolymer. The content of the compound having a functional group may be 15% by weight or less based on the weight of the PMMA containing the functional group.

The PMMA resin may have a melt volume index (MVI) of 0.5 g/10 minutes to 10 g/10 minutes when measured at a temperature of 230° C. under a load of 3.8 kg.

The acrylic resin layer may further comprise a UV absorbent.

A benzotriazole-based, benzotriazine-based, or the like may be used as the UV absorbent.

The content of the UV absorbent may be 0.1% by weight to 10% by weight, or 0.5% by weight to 5% by weight, based on the weight of the acrylic resin layer.

Such a UV absorbent may compensate for the low UV resistance of the acrylic resin layer.

Physical Properties of the First Sheet

According to an embodiment, the fluorinated polymer resin layer may have a thickness of 5 μm to 12 μm or 3 μm to 15 μm.

According to an embodiment, the acrylic resin layer may have a thickness of 10 μm to 50 μm, 10 μm to 30 μm, or 20 μm to 30 μm.

As a specific example, the fluorinated polymer resin layer may have a thickness of 5 μm to 12 μm, and the acrylic resin layer may have a thickness of 20 μm to 30 μm.

According to an embodiment, the acrylic resin layer and the fluorinated polymer resin layer may have a surface roughness (Ra) of 0.01 μm to 2.0 μm, respectively.

The fluorinated polymer resin layer may have a surface roughness (Ra) of 0.01 μm to 2.0 μm, 0.1 μm to 1.5 μm, or 0.1 μm to 1.0 μm. In addition, the acrylic resin layer may have a surface roughness (Ra) of 0.01 μm to 2.0 μm, 0.1 μm to 1.5 μm, or 0.1 μm to 1.0 μm.

Since the first sheet is prepared at a time by coextrusion, there may be almost no difference in the surface roughness between the acrylic resin layer and the fluorinated polymer resin layer.

According to an embodiment, the difference between the surface roughness (Ra) of the acrylic resin layer and the surface roughness (Ra) of the fluorinated polymer resin layer may be 0.7 μm or less. For example, the surface roughness (Ra) of the acrylic resin layer and the surface roughness (Ra) of the fluorinated polymer resin layer may have a difference of 0.7 μm or less, 0.5 μm or less, 0.3 μm or less, 0.2 μm or less, or 0.1 μm or less. When the difference in surface roughness between the acrylic resin layer and the fluorinated polymer resin layer is within the above preferred range, the effect of preventing sheet deformation in the high-temperature lamination process with a steel sheet may be more excellent.

The first sheet may have a light transmittance of 85% or more, 90% or more, or 94% or more (according to ASTM D1006). The first sheet may have a haze in a range of 50% to 75% or 65% to 75% (according to ASTM D1006).

The first sheet may have excellent weatherability (UV resistance). According to an embodiment, the first sheet may have a color difference (ΔE) of 3.0 or less when exposed for 96 hours to light having a wavelength of 300 nm to 400 nm under the conditions of 1,500 W/m² and 70° C.

Second Sheet

The second sheet (200) comprises a substrate layer (230).

The substrate layer (230) is selected from the group consisting of a polyester resin layer, a polyolefin resin layer, a polyvinyl chloride resin layer, an aluminum foil layer, and a combination thereof.

The polyester resin layer may comprise a polyethylene terephthalate (PET) resin, a polyethylene naphthalate (PEN) resin, a copolymerized polyethylene terephthalate (Co-PET), or the like. As a specific example, the polyester resin layer may be a polyethylene terephthalate (PET) resin layer, that is, a PET film. In addition, at least one side of the PET film may be subjected to hairline pattern treatment to further enhance the aesthetics.

The polyolefin resin layer may comprise a polyethylene resin, a polypropylene resin, or the like. As a specific example, the polyolefin resin layer may be a polypropylene resin layer, that is, a PP film.

The polyvinyl chloride resin layer may be, for example, a polyvinyl chloride resin layer of thermal resistance grade specialized for a steel sheet.

The substrate layer may have a thickness of 15 μm to 160 μm, 15 μm to 150 μm, or 20 μm to 150 μm.

Specifically, the thickness of the polyester resin layer, the polyolefin resin layer, and the polyvinyl chloride resin layer may be 15 μm to 160 μm, 15 μm to 150 μm, or 20 μm to 150 μm, respectively. The thickness of the aluminum foil may be 6 μm to 30 μm, 10 μm to 30 μm, or 17 μm to 30 μm.

In addition, the substrate layer may be two or more selected from the group consisting of a polyester resin layer, a polyolefin resin layer, a polyvinyl chloride resin layer, and an aluminum foil layer. For example, the substrate layer may be a laminated sheet of a polyester resin layer and an aluminum foil layer, a polyolefin resin layer and an aluminum foil layer, or a polyvinyl chloride resin layer and an aluminum foil layer. Preferable is a laminated sheet of a polyester resin layer and an aluminum foil layer, but it is not limited thereto. The substrate layer may have a thickness of 6 μm to 150 μm, 15 μm to 150 μm, or 25 μm to 150 μm.

According to an embodiment, the second sheet (200) may further comprise at least one functional layer (220) formed on at least one side (upper side or lower side) of the substrate layer (230). For example, the functional layer may be disposed on the upper or lower side of the substrate layer. Alternatively, the functional layer may be disposed on both of the upper and lower sides of the substrate layer.

According to an embodiment, the functional layer may be selected from the group consisting of a printing layer, a color layer, a pattern layer, and an aluminum vapor deposition layer. Such a functional layer can improve the appearance by introducing a design, color, pattern, or the like to the laminated steel sheet.

In addition, the second sheet (200) may further comprise an adhesive layer (210) for enhancing the adhesion with the first sheet (100). The adhesive layer (210) may comprise an optically transparent adhesive.

The adhesive may be modified to provide a bonding strength between the first sheet (in particular, the acrylic resin layer) and the second sheet (the functional layer or the substrate layer) or a commercially available one.

Steel Sheet

The steel sheet (340) may comprise an electro-galvanized steel sheet, a hot-dip galvanized steel sheet, a cold-rolled steel sheet, a stainless steel sheet, a galvalume steel sheet, or an aluminum coil.

At least one of a pretreatment layer (330), an undercoat layer (320), and an adhesive layer (310) may be formed on one side of the steel sheet (340).

The pretreatment layer (330) serves to modify the surface of the steel sheet by removing the foreign matters on the surface of the steel sheet to facilitate the process of forming an undercoat layer on the steel sheet.

The undercoat layer (320) may increase the durability of the steel sheet and increase the bonding strength of the interface between the steel sheet and other layers so that the process can be carried out smoothly.

The adhesive layer (310) is for increasing the adhesion with the second sheet (200) and may comprise an optically transparent adhesive.

Exemplary Lamination Configuration

According to an embodiment, the laminated steel sheet has a steel sheet, a pretreatment layer, an undercoat layer, an adhesive layer, a substrate layer, a functional layer, an adhesive layer, an acrylic resin layer, and a fluorinated polymer resin layer laminated in this order. The substrate layer may be selected from the group consisting of a polyester resin layer, a polyolefin resin layer, a polyvinyl chloride resin layer, and an aluminum foil layer. The functional layer may be selected from the group consisting of a printing layer, a color layer, a pattern layer, and an aluminum vapor deposition layer.

In addition, in the lamination configuration, the lamination sequence (that is, the vertical relationship) of the substrate layer and the functional layer may be changed with each other.

Process for Preparing a Laminated Steel Sheet

Figure 2:
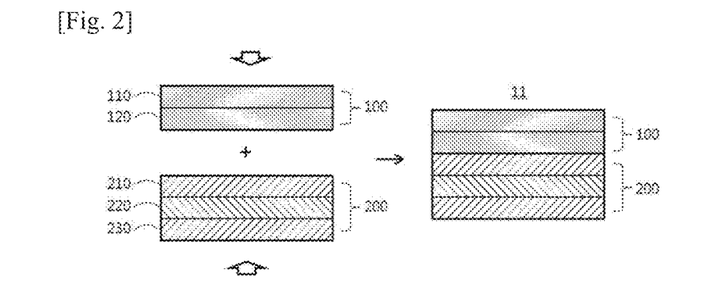
FIG. 2 shows a process of preparing a laminated steel sheet according to an embodiment.
Figure 3:
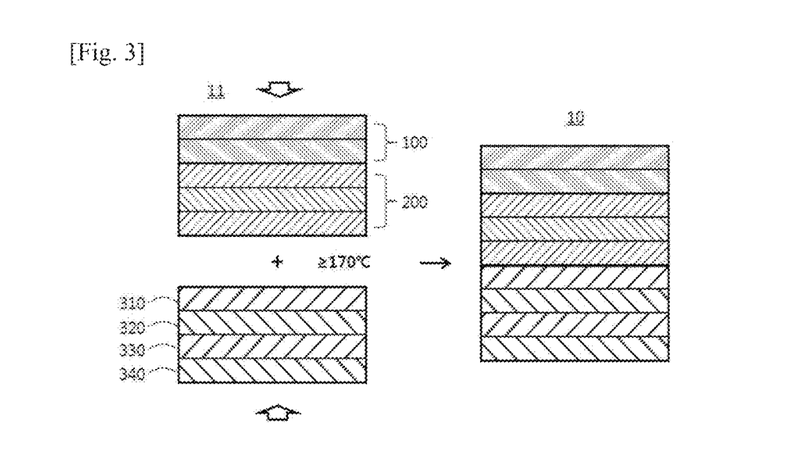
FIG. 3 shows a process of preparing a laminated steel sheet according to an embodiment.

FIGS. 2 and 3 show a process of preparing a laminated steel sheet according to an embodiment, respectively.

Referring to FIGS. 2 and 3, the process for preparing a laminated steel sheet (10) comprises coextruding an acrylic resin and a fluorinated polymer resin to prepare a first sheet (100); laminating the first sheet (100) with a second sheet (200) comprising a substrate layer (230) selected from the group consisting of a polyester resin layer, a polyolefin resin layer, a polyvinyl chloride resin layer, an aluminum foil layer, and a combination thereof to prepare a composite sheet (11); and laminating the composite sheet (11) with a steel sheet (340).

Step of Preparing a First Sheet

First, an acrylic resin and a fluorinated polymer resin are coextruded to prepare a first sheet (100).

A fluorinated polymer resin layer (110) and an acrylic resin layer (120) may be integrally formed by the coextrusion without a separate adhesive or a high-temperature lamination process.

Unlike this, if an adhesive is used, the adhesive may permeate into the sheet, thereby causing a problem of deteriorating the optical properties such as reflectance. If a high-temperature lamination process is adopted, there may be a problem in that the physical properties of the sheet is deteriorated. In addition, if an adhesive or a high-temperature lamination process is used, separate additional steps are required, which is not preferable in terms of cost.

Figure 4:
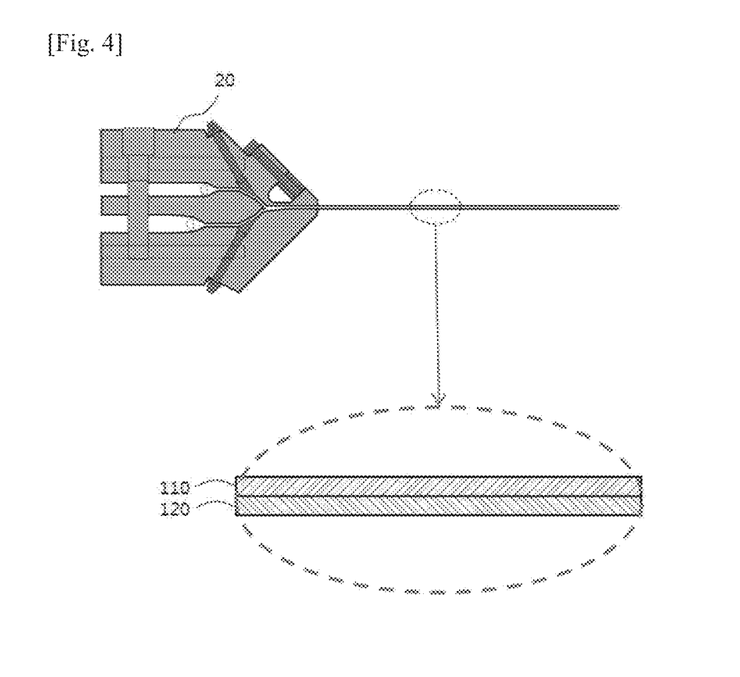
FIG. 4 shows an exemplified process for preparing a first sheet by coextrusion.

FIG. 4 shows an exemplified process for preparing a first sheet by coextrusion.

Referring to FIG. 4, an acrylic resin and a fluorinated polymer resin are simultaneously extruded through two extruders or an extruder (20) provided with two nozzles to prepare a first sheet (100) in which a fluorinated polymer resin layer (110) and an acrylic resin layer (120) are integrally bonded in a molten state A method using a tubular or a die may be used in the coextrusion. Here, the die is preferably a flat die (e.g., a T die, a coat hanger die, and the like), a straight die, and a circular die (e.g., a crosshead die and the like) for a feed block type, and a manifold type, or the like. But it is not limited thereto.

The extruder that can be used in the present invention may be a single- or multi-screw extruder, as well as a tandem extruder composed of multiple extruders. In addition, a motionless mixer or an equivalent device is inserted into an adapter that allows the extruder to connect to the die to maintain a uniform resin temperature.

Step of Preparing a Composite Sheet

Next, the first sheet (100) is laminated with a second sheet (200) comprising a substrate layer (230) to prepare a composite sheet (11).

The lamination of the first sheet and the second sheet may be carried out with an adhesive or by a thermal lamination process. The adhesive may be a conventional adhesive.

The lamination of the first sheet and the second sheet may be carried out at 60° C. to 160° C. For example, when the substrate layer is a polyester resin layer or a polyolefin resin layer, the lamination of the first sheet and the second sheet may be carried out at 60° C. to 90° C. Specifically, when the substrate layer is a polyester resin layer or a polyolefin resin layer, the lamination of the first sheet and the second sheet may be carried out at 60° C. to 90° C. with an adhesive. As another example, when the substrate layer is a polyvinyl chloride resin layer, the lamination of the first sheet and the second sheet may be carried out at 150° C. to 160° C. Specifically, when the substrate layer is a polyvinyl chloride resin layer, the lamination of the first sheet and the second sheet may be carried out at 150° C. to 160° C. by thermal lamination.

In addition, when the first sheet and the second sheet are laminated, the surface thereof may be subjected to embossing treatment for the purpose of enhancing its aesthetics, or an acrylic urethane-based hard coating may be applied to the upper side of the fluorinated polymer resin layer to enhance the scratch resistance.

Step of Laminating the Composite Sheet with a Steel Sheet

Thereafter, the composite sheet (11) is laminated with a steel sheet (340).

According to an embodiment, the lamination of the composite sheet and the steel sheet may be carried out at a temperature of 150° C. or higher.

Specifically, a high-temperature lamination process is required in order to bond the composite sheet with a rigid steel sheet. For example, the lamination of the composite sheet and the steel sheet may be carried out at a temperature of 150° C. or higher, 170° C. or higher, or 200° C. or higher. More specifically, the lamination of the composite sheet and the steel sheet may be carried out at a temperature of 150° C. to 300° C. or 170° C. to 230° C.

The lamination of the composite sheet and the steel sheet may be carried out by passing them between a steel roll and a rubber roll capable of temperature control. The pressure of the lamination may range from 1 kgf/m$^2$ to 10 kgf/m$^2$. Then, a cooling step ensues.

In addition, the lamination of the composite sheet and the steel sheet may be carried out once at least one of a pretreatment layer, an undercoat layer, and an adhesive layer has been formed on one side of the steel sheet in order to enhance the adhesion between layers, coating film hardness, corrosion resistance, and chemical resistance. For example, it may be carried out once an adhesive has been applied to the steel sheet.

According to the process for preparing a laminated steel sheet, since a substrate layer having excellent thermal resistance is interposed between the fluorinated polymer resin layer and the steel sheet, it is possible to prevent the fluorinated polymer resin layer having insufficient thermal resistance from being deformed in a high-temperature lamination process.

In addition, according to the process for preparing a laminated steel sheet, since the acrylic resin layer and the fluorinated polymer resin layer are laminated by coextrusion, no separate adhesive is required between them. In addition, since the coextruded film has almost no difference in the surface roughness, it is possible to securely suppress the deformation at high temperatures.

The sheet according to an embodiment may comprise an acrylic resin layer and a fluorinated polymer resin layer formed by coextruding an acrylic resin and a fluorinated polymer resin.

Details on the acrylic resin layer and the fluorinated polymer resin layer are as described above.

According to an embodiment, the sheet has a color difference (ΔE) of 3.0 or less when exposed for 96 hours to light having a wavelength of 300 nm to 400 nm under the conditions of 1,500 W/m² and 70° C.

EMBODIMENTS FOR CARRYING OUT THE INVENTION

Example

Hereinafter, the present invention will be described in more detail with reference to the following examples. However, these examples are set forth to illustrate the present invention, and the scope of the present invention is not limited thereto.

Example 1-1

Preparation of a Coextrusion Film of PVdF/PMMA 100 parts by weight of a homo-PVdF resin (Kynar720, Arkema) was used as a raw material for a PVdF resin layer, and 97 parts by weight of a modified PMMA resin (SKC) with 3 parts by weight of a benzatriazole-based UV absorbent was used as a raw material for a PMMA resin layer. They were each compounded in a twin-screw kneader at a temperature of 230° C. to prepare respective pellets thereof.

The pellets of the raw materials of the PVdF resin layer and the PMMA resin layer thus prepared were each fed to a 65 mm single-screw first extruder and a 90 mm single-screw second extruder, melt kneaded at about 230° C., and coextruded through a two-layer feed block type T-die to a PVdF/PMMA resin layer. In such event, the discharged coextrusion film was passed between a heating roll and an embossed rubber roll to enhance the gripping force on the heating roll and to impart a surface roughness to the coextrusion melt.

The coextruded film had a total thickness of 33 μm, in which the thickness of the PVdF resin layer was 8 μm, and the thickness of the PMMA resin layer was 25 μm.

Comparative Example 1-1

Preparation of a Single Film of PVdF

A composition as a material for a PVdF resin layer in which 3 parts by weight of a benzotriazole-based UV absorbent was added to 97 parts by weight of a homo-PVdF resin (Kynar720, Arkema) was compounded in a twin-screw kneader at a temperature of 230° C. to prepare pellets. The pellets thus prepared were fed to a 65 mm single-screw extruder, melt kneaded at about 230° C., and extruded through a T-die to obtain a PVdF film. In such event, the discharged film was passed between a heating roll and an embossed rubber roll to enhance the gripping force on the heating roll and to impart a surface roughness to the coextrusion melt, thereby preparing a PVdF film having a thickness of 25 μm.

Comparative Example 1-2

Preparation of a Single Film of PMMA

Pellets of a modified PMMA resin (SKC) were fed to a 65 mm single-screw extruder, melt kneaded at about 230° C., and extruded through a T-die to obtain a PMMA film. In such event, the discharged film was passed between a heating roll and an embossed rubber roll to enhance the gripping force on the heating roll and to impart a surface roughness to the coextrusion melt, thereby preparing a PMMA film having a thickness of 50 μm.

Comparative Example 1-3

Preparation of a Single Film of PMMA

The same procedure as in Comparative Example 1-2 was repeated, except that 3 parts by weight of a benzotriazole-based UV absorbent was added to 97 parts by weight of a modified PMMA resin (SKC) as a raw material to prepare a PMMA film having a thickness of 50 μm.

TABLE 1

| | Thickness of each layer (μm) | | Content of UV absorbent |
|---|---|---|---|
| | PVdF layer | PMMA layer | (PMMA layer) (wt. %) |
| Ex. 1-1 | 8 | 25 | 3 |
| C. Ex. 1-1 | 25 | 0 | 3 |
| C. Ex. 1-2 | 0 | 50 | 0 |
| C. Ex. 1-3 | 0 | 50 | 3 |

Test Example 1

For the films obtained in the Examples and Comparative Examples, the following items were evaluated, and the results are shown in Table 2.

(1) Chemical Resistance (Solvent Resistance)

Methyl ethyl ketone (MEK) was applied dropwise to the sample surface, which was kept at 25° C. for 24 hours to observe the appearance.

○: No change in appearance
×: Deformation in appearance such as whitening was observed (2) Contamination Resistance The surface of the sample was marked with an oil-based pen and maintained at 25° C. for 24 hours. It was then checked whether the mark was well removed when wiped with a cloth.

○: The mark was readily removed
×: The mark was not readily removed (3) Surface Appearance It was checked whether the additive eluted on the sample surface.

○: No elution was observed on the surface
×: Elution was observed on the surface

TABLE 2

| | Chemical resistance | Contamination resistance | Surface appearance |
|---|---|---|---|
| Ex. 1-1 | ○ | ○ | ○ |
| C. Ex. 1-1 | ○ | — | × |
| C. Ex. 1-2 | × | × | ○ |
| C. Ex. 1-3 | × | × | ○ |

As shown in Table 2 above, the coextrusion film of PVdF/PMMA in Example 1-1 had excellent chemical resistance, contamination resistance, and surface appearance characteristics, in contrast, the single-layer film of PVdF or PMMA in Comparative Examples 1-1 to 1-3 was poor in at least one of chemical resistance, contamination resistance, and surface appearance characteristics.

Example 2-1

Preparation of a Composite Sheet

A urethane-based adhesive was applied to a color-printed PET film to a thickness of 5 μm, which was dried at 90° C. or higher. It was then laminated with the coextrusion film of PVdF/PMMA prepared in Example 1-1 using a conventional dry lamination apparatus, thereby preparing a composite sheet. In such event, the lamination was carried out under the conditions of a pressure of about 6 kgf/m$^2$ and a speed of 30 m/hr.

Comparative Examples 2-1 to 2-3

Preparation of a Composite Sheet

A composite sheet was prepared in the same manner as in Example 2-1, except that the films prepared in Comparative Examples 1-1 to 1-3 were used.

Test Example 2

For the composite sheets obtained in the Examples and Comparative Examples, the chemical resistance, contamination resistance, and surface appearance as in Test Example 1 and the UV resistance according to the following method were evaluated. The results are shown in Table 3.

UV Resistance

The sample was irradiated for 96 hours under the conditions of 1500 W/m$^2$ and 70° C. using a metal halide lamp having a wavelength of 300 nm to 400 nm. The color difference (ΔE) after the weatherability test as compared with the initial stage of the sample was measured using a spectrophotometer.

○: ΔE≤3
×: ΔE>3 (yellowing)

TABLE 3

|  | UV resistance | Chemical resistance | Contamination resistance | Surface appearance |
|---|---|---|---|---|
| Ex. 2-1 | ○ | ○ | ○ | ○ |
| C. Ex. 2-1 | × | ○ | — | × |
| C. Ex. 2-2 | × | × | × | ○ |
| C. Ex. 2-3 | ○ | × | × | ○ |

As shown in Table 3 above, the composite sheet of Example 2-1 had excellent UV resistance, chemical resistance, contamination resistance, and surface appearance characteristics as compared with Comparative Examples 2-1 to 2-3.

In particular, the composite sheet of Example 2-1 had a ΔE of about 0.66 as a result of the UV resistance evaluation, whereas the composite sheet of Comparative Example 2-2 had a ΔE of about 30.06, indicating a remarkable difference.

Specifically, the composite sheet of Example 2-1 was prepared using the coextrusion film of PVdF/PMMA prepared in Example 1-1. Since the PVdF resin layer and the PMMA resin layer were in contact with each other by coextrusion in the film, they were highly compatible with each other. Thus, the adhesion and interaction at the interface could be maximized, thereby achieving a high bonding strength. The interlayer bonding strength of such a coextruded film is significantly higher than the case where the PVdF film and PMMA film are separately prepared and then laminated with an adhesive. If the PVdF film and the PMMA film are laminated using an adhesive, the performance of the adhesive usually deteriorates when exposed to high temperatures or UV in the process of long-term storage, whereby the layers may be locally lifted or peeled off from each other, or yellowing of the adhesive may adversely affect the product quality.

However, the coextrusion of the two layers of the PVdF resin layer and the PMMA resin layer as in Example 2-1 may solve the above problems. In particular, since the PMMA resin layer is protected by the PVdF resin layer, the weatherability can be maximized. If a UV absorbent is added to the PMMA resin layer, the discoloration and deformation of the PMMA resin layer can be more effectively prevented. Thus, the composite sheet of Example 2-1 has excellent UV resistance, so that it can effectively prevent a conventional printing layer from being denatured. In addition, since PMMA, which has excellent thermal resistance, is employed, the composite sheet has excellent chemical resistance, contamination resistance, and surface appearance characteristics even during the thermal lamination process in the subsequent process.

In contrast, if a single-layer PVDF film is used as in the composite sheet of Comparative Example 2-1, it is impossible to perform the thermal lamination in the subsequent process, and the contamination resistance and surface appearance characteristics are poor. In addition, if a UV absorbent is added to the single-layer PVDF film as in Comparative Example 2-1, the UV absorbent migrates to the surface over time, thereby impairing the surface appearance characteristics.

In addition, in the single-layer PMMA film as in Comparative Example 2-2, yellowing or deformation of the lower adhesive and the substrate film (i.e., the PET film) may be caused by UV. If a UV absorbent is added to the single-layer PMMA film as in Comparative Example 2-3 in order to solve the above problem, the UV performance can be improved, whereas the problem of low chemical resistance and contamination resistance inherent to PMMA is still present.

Example 3-1

Process for Preparing a Laminated Steel Sheet

A 1-mm hot dip galvanized steel sheet was pretreated (alkali-treated) to remove impurities on the surface. A polyester-based undercoat layer was then formed thereon to a thickness of 5 μm. An adhesive composition for imparting interlayer adhesion was coated on the undercoat layer to a thickness of 5 μm, which was then dried. In such event, the adhesive composition was composed of 60% by weight of a polyester resin and 40% by weight of a toluene solvent.

The steel sheet that had been subjected to the above process was laminated with the composite sheet prepared in Example 2-1 by passing them through a steel roll and a rubber roll that can be controlled to a low temperature. In such event, the lamination was carried out under the conditions of a surface temperature of about 200° C., a pressure within about 7 kgf/m², and a speed of 30 m/hr.

Comparative Examples 3-1 to 3-3

Process for Preparing a Laminated Steel Sheet

A laminated steel sheet was prepared in the same manner as in Example 3-1, except that the films prepared in Comparative Examples 2-1 to 2-3 were used.

Test Example 3

For the laminated steel sheets obtained in the Examples and Comparative Examples, the chemical resistance, contamination resistance, surface appearance, and UV resistance as in Test Examples 1 and 2 and the surface durability according to the following method were evaluated. The results are shown in Table 4.

Surface Durability

The surface of the steel sheet was cross-cut, which was subjected to Erichsen with 8 mm and left for 1,000 hours in an ultraviolet beam (UVB). It was observed whether the surface of the steel sheet was peeled off.
∘: Surface was not peeled off
x: Surface was peeled off

TABLE 4

|  | UV resistance | Chemical resistance | Contamination resistance | Surface appearance | Surface durability |
|---|---|---|---|---|---|
| Ex. 3-1 | ∘ | ∘ | ∘ | ∘ | ∘ |
| C. Ex. 3-1 | x | ∘ | — | x | x |
| C. Ex. 3-2 | x | x | x | ∘ | x |
| C. Ex. 3-3 | ∘ | x | x | ∘ | x |

As shown in Table 4 above, the laminated steel sheet of Example 3-1 was excellent in such characteristics as UV resistance, chemical resistance, contamination resistance, surface appearance, and surface durability as compared with Comparative Examples 3-1 to 3-3. Specifically, the laminated steel sheet of Example 3-1 did not have a problem in that the PVDF resin layer was deformed even during the lamination process at high temperatures; thus, it had excellent surface durability.

The invention claimed is:

1. A laminated steel sheet, which comprises a steel sheet; and a first sheet disposed on the steel sheet, wherein the first sheet comprises an acrylic resin layer, and a fluorinated polymer resin layer formed directly on one side of the acrylic resin layer;
    wherein the acrylic resin layer is a poly(methyl methacrylate) resin layer,
    wherein the poly(methyl methacrylate) resin has a melt volume index (MVI) of 0.5 g/10 minutes to 10 g/10 minutes when measured at a temperature of 230° C. under a load of 3.8 kg,
    wherein the fluorinated polymer resin layer is a polyvinylidene fluoride (PVdF) resin layer,
    wherein the polyvinylidene fluoride resin has a viscosity in the range of 4,000 poise to 12,000 poise when measured at 230° C. at a shear rate of 100 s$^{-1}$ using a rheometer,
    wherein the first sheet is prepared by coextrusion,
    wherein the acrylic resin layer and the fluorinated polymer resin layer have a surface roughness (Ra) of 0.01 μm to 2.0 μm, respectively, and
    wherein the difference between the surface roughness (Ra) of the acrylic resin layer and the surface roughness (Ra) of the fluorinated polymer resin layer is 0.7 μm or less.

2. The laminated steel sheet of claim 1, wherein the fluorinated polymer resin layer is disposed as the outermost layer of the laminated steel sheet.

3. The laminated steel sheet of claim 1, wherein the difference between the surface roughness (Ra) of the acrylic resin layer and the surface roughness (Ra) of the fluorinated polymer resin layer is 0.3 μm or less.

4. The laminated steel sheet of claim 1, which has the steel sheet, a pretreatment layer, an undercoat layer, a first adhesive layer, a substrate layer, a functional layer, a second adhesive layer, the acrylic resin layer, and the fluorinated polymer resin layer laminated in this order,
    wherein the substrate layer is selected from the group consisting of a polyester resin layer, a polyolefin resin layer, a polyvinyl chloride resin layer, an aluminum foil layer, and a combination thereof, and
    the functional layer is selected from the group consisting of a printing layer, a color layer, a pattern layer, and an aluminum vapor deposition layer.

5. The laminated steel sheet of claim 1, which further comprises a second sheet between the steel sheet and the first sheet, wherein the second sheet comprises a substrate layer selected from the group consisting of a polyester resin layer, a polyolefin resin layer, a polyvinyl chloride resin layer, an aluminum foil layer, and a combination thereof.

6. The laminated steel sheet of claim 5, wherein the second sheet further comprises at least one functional layer formed on at least one side of the substrate layer.

7. The laminated steel sheet of claim 6, wherein the functional layer is selected from the group consisting of a printing layer, a color layer, a pattern layer, and an aluminum vapor deposition layer.

8. A process for preparing a laminated steel sheet, which comprises:
    coextruding an acrylic resin and a fluorinated polymer resin to prepare a first sheet;
    laminating the first sheet with a second sheet comprising a substrate layer selected from the group consisting of a polyester resin layer, a polyolefin resin layer, a polyvinyl chloride resin layer, an aluminum foil layer, and a combination thereof to prepare a composite sheet; and
    laminating the composite sheet with a steel sheet,
    wherein the acrylic resin layer is a poly(methyl methacrylate) resin layer,
    wherein the poly(methyl methacrylate) resin has a melt volume index (MVI) of 0.5 g/10 minutes to 10 g/10 minutes when measured at a temperature of 230° C. under a load of 3.8 kg,
    wherein the fluorinated polymer resin layer is a polyvinylidene fluoride (PVdF) resin layer, wherein the polyvinylidene fluoride resin has a viscosity in the range of 4,000 poise to 12,000 poise when measured at 230° C. at a shear rate of 100 s$^{-1}$ using a rheometer, wherein the acrylic resin layer and the fluorinated polymer resin layer have a surface roughness (Ra) of 0.01 μm to 2.0 μm respectively, and wherein the difference between the surface roughness (Ra) of the acrylic resin layer and the surface roughness (Ra) of the fluorinated polymer resin layer is 0.7 μm or less.

9. The process for preparing a laminated steel sheet of claim 8, wherein the lamination of the composite sheet and the steel sheet is carried out at a temperature of 150° C. or higher.

* * * * *